United States Patent [19]

Thacker

[11] Patent Number: 4,963,747
[45] Date of Patent: Oct. 16, 1990

[54] IONIZING RADIATION DETECTOR

[75] Inventor: Louis H. Thacker, Knoxville, Tenn.

[73] Assignee: The United States of America as represented by the United States Department of Energy, Washington, D.C.

[21] Appl. No.: 363,032

[22] Filed: Jun. 8, 1989

[51] Int. Cl.$^5$ .............................................. G01J 1/185
[52] U.S. Cl. ...................................... 250/388; 250/389
[58] Field of Search ................................ 250/389, 388

[56] References Cited

U.S. PATENT DOCUMENTS 3,443,097  5/1969  Smith .................................. 250/388

Primary Examiner—Constantine Hannaher
Attorney, Agent, or Firm—David E. Breeden; Stephen D. Hamel; William R. Moser

[57] ABSTRACT

An ionizing radiation detector is provided which is based on the principle of analog electronic integration of radiation sensor currents in the sub-pico to nano ampere range between fixed voltage switching thresholds with automatic voltage reversal each time the appropriate threshold is reached. The thresholds are provided by a first NAND gate Schmitt trigger which is coupled with a second NAND gate Schmitt trigger operating in an alternate switching state from the first gate to turn either a visible or audible indicating device on and off in response to the gate switching rate which is indicative of the level of radiation being sensed. The detector can be configured as a small, personal radiation dosimeter which is simple to operate and responsive over a dynamic range of at least 0.01 to 1000 R/hr.

7 Claims, 3 Drawing Sheets

IONIZING RADIATION DETECTOR

BACKGROUND OF THE INVENTION

This invention, which is a result of a contract with the U.S. Department of Energy, relates generally to ionizing radiation detectors and more specifically to small, personal radiation monitors.

In the field of personal radiation monitoring, there is an ever increasing need for inexpensive, reliable and compact personal radiation monitors which remain sensitive for long periods of time without recharging or changing batteries. The problems of possible human exposure to ionizing radiation from nuclear attacks, nuclear reactor accidents or exposure to gamma or X-radiation in industry, medicine or other environments is a constant concern of government agencies, such as the Federal Emergency Management Agency (FEMA). In order to provide radiation detectors for use by the general public, the instruments must be inexpensive, compact and simple to operate in order to be accepted and used.

SUMMARY OF THE INVENTION

In view of the above need, it is an object of this invention to provide a simple, inexpensive and reliable ionizing radiation monitor.

Further, it is an object of this invention to provide a radiation monitor as in the above case which will remain operable over extended periods using conventional battery power supplies.

Other objects and many of the attendant advantages of the present invention will be apparent from the following detailed description of preferred embodiments of the invention taken in conjunction with the drawings.

Briefly, the invention is an ionizing radiation detector comprising first and second switching means connected to alternately operate in one of first and second states as indicated by the signal level at the outputs thereof corresponding to the signal levels applied to a pair of inputs thereof by connecting the output of the first switching means to one input of the second switching means. An ionizing radiation responsive means including a charge storage means is coupled between the output and one input of the first switching means to apply a switching voltage to the first switching means so that it is alternately switched from the first state to the second state upon the detection of ionizing radiation and at a rate corresponding to the level of detected radiation. An indicating means is coupled to the output of the second switching means which is activated when the second switching means is switched from the second state to the first state in response to the switching of the first switching means from the first state to the second state by the ionizing radiation responsive means.

In accordance with one embodiment of the invention, the ionizing radiation responsive means includes either an ionization chamber or photoconductor radiation sensor connected in series with a capacitor between the output of the first switching means and ground potential. The switching means are connected so that when power is applied to the circuit, the output of the first switching means is high (the first state), applying a bias voltage to the sensor, and the output of the second switching means, which is connected to an indicator, is low (the second state). As ionizing radiation is sensed by the sensor, the sensor conducts and the capacitor is charged. By applying the voltage across the capacitor to one input of the first switching means, it is switched when the voltage across the capacitor exceeds an upper switching threshold of the switching means, causing the output to go low. This causes the second switching means to change states which forces the output high, causing the indicators to be momentarily activated. While the output of the first switching means is low, the capacitor discharges through the sensor and the first switching means is reset to the first state when the voltage falls below a lower switching threshold again. This switching cycle continues as long as the sensor is in an ionizing radiation field and at a rate depending on the radiation level.

In accordance with a further embodiment of the invention, the above basic switching circuit is extended to record the radiation count rate by connecting the output of the second switching means to a counter or count-rate meter. An audible alarm may be added by connecting a speaker driver circuit to the output of the first switching means which senses the change in state of the first switching means to the low state and pulses a speaker to provide a "tone burst" alarm.

DETAILED DESCRIPTION

Figure 1:
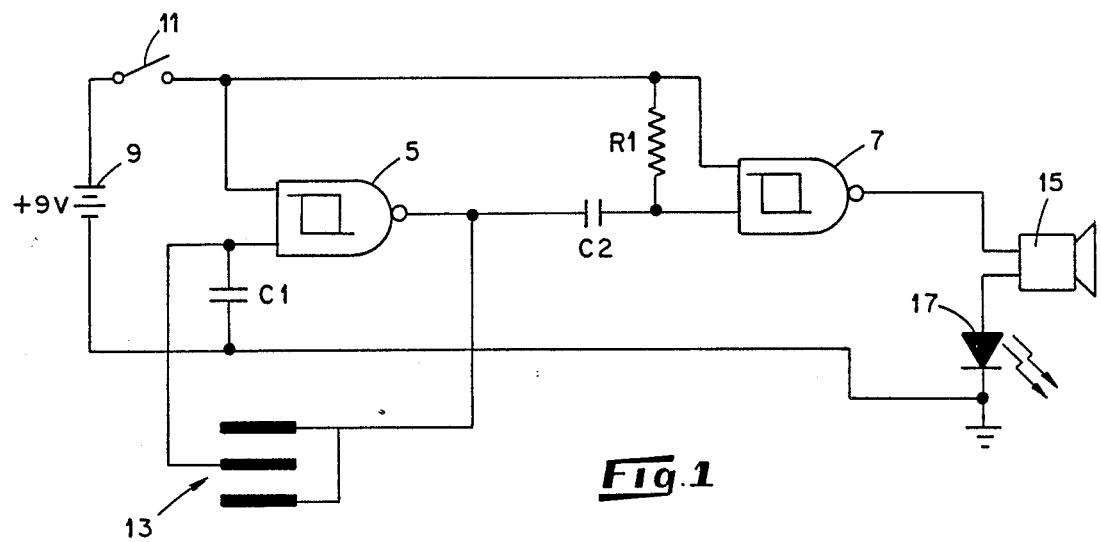
FIG. 1 is a schematic circuit diagram of one embodiment of a radiation detector according to the present invention.

Referring now to FIG. 1, a pair of NAND gates 5 and 7, which act as first and second switching means in this basic embodiment, are connected with the output of the first NAND gate 5 coupled to one input of the second NAND gate 7 through a capacitor C2. The NAND gates used in each of the embodiments disclosed herein are preferably of the CMOS integrated circuit (IC) type such as the model CD4093B CMOS quad dual-input NAND Schmitt trigger supplied by RCA, Solid State Division, Somerville, N.J. These ICs have four NAND gates per IC which have built-in hysteresis and switch output states extremely fast once the built-in upper or lower switching thresholds are crossed. In the examples here, using a 9 volt DC power supply 9, the upper switching threshold is about 6 volts and the lower switching threshold is about 4 volts, assuming one input is held high (+9V) by connecting it to the +9V side of the power supply and the switching voltage is applied to the second input. The output of the gate remains high (+9V) until the signal applied to the second input exceeds the +6V upper threshold causing the device to switch states, changing the output to a low level (ground potential) until the second input falls below the +4V lower threshold.

In the embodiment of FIG. 1, only two of the four NAND gates of the integrated circuit are used. The power supply 9 has the positive side connected through a switch 11 to the first inputs of gates 5 and 7, respectively, and to the second input of gate 7 through a resistor R1. A radiation sensing means including an ion chamber 13 connected between the output of gate 5 and the second input thereof and an integrating capacitor C1 connected between the second input of gate 5 and ground potential. The ion chamber 13 in this embodiment is a three-parallel-plate array of small conductive plane plates so connected that the outer plates are driven by the output of gate 5 and the inner plate is connected to the integrating capacitor C1 and to one input of gate 5. The ion chamber 13 is unsealed, using ambient air as the ionizing medium.

The output of gate 7, which may be connected to various indicating devices, is connected to a speaker 15 which is connected in series with a light emitting diode (LED) 17 to ground potential so that both the speaker and the LED are activated when the output of gate 7 goes high indicating that sufficient radiation has been detected to activate the device. The speaker 15 used in this embodiment is of the type having a built in oscillator which responds to the applied dc pulse to drive the speaker element at the oscillator frequency which is in the audible range for the duration of the pulse.

In operation with the switch 11 closed, the output of gate 5 is high at about +9V when the second input connected to the ion chamber 13 is below the upper threshold. The output of gate 5 provides the operating voltage for the ion chamber 13. When ionizing radiation is detected by the chamber 13, current flows through the chamber to capacitor C1, charging the capacitor. When sufficient radiation has been detected to raise the voltage across C1 to a level that exceeds the upper threshold of gate 5, gate 5 switches states and the output goes low (ground potential). While the output of gate 5 is low, the capacitor C1 discharges through the chamber 13 back into the output of gate 5 until the voltage across C1 falls below the lower threshold of gate 5, at which time the output of the gate switches back to the high state. Thus, the ion chamber 13 voltage is cyclically reversed and capacitor C1 is alternately charged and discharged through the ion chamber, at a rate determined by the ion-chamber current.

Figure 2:
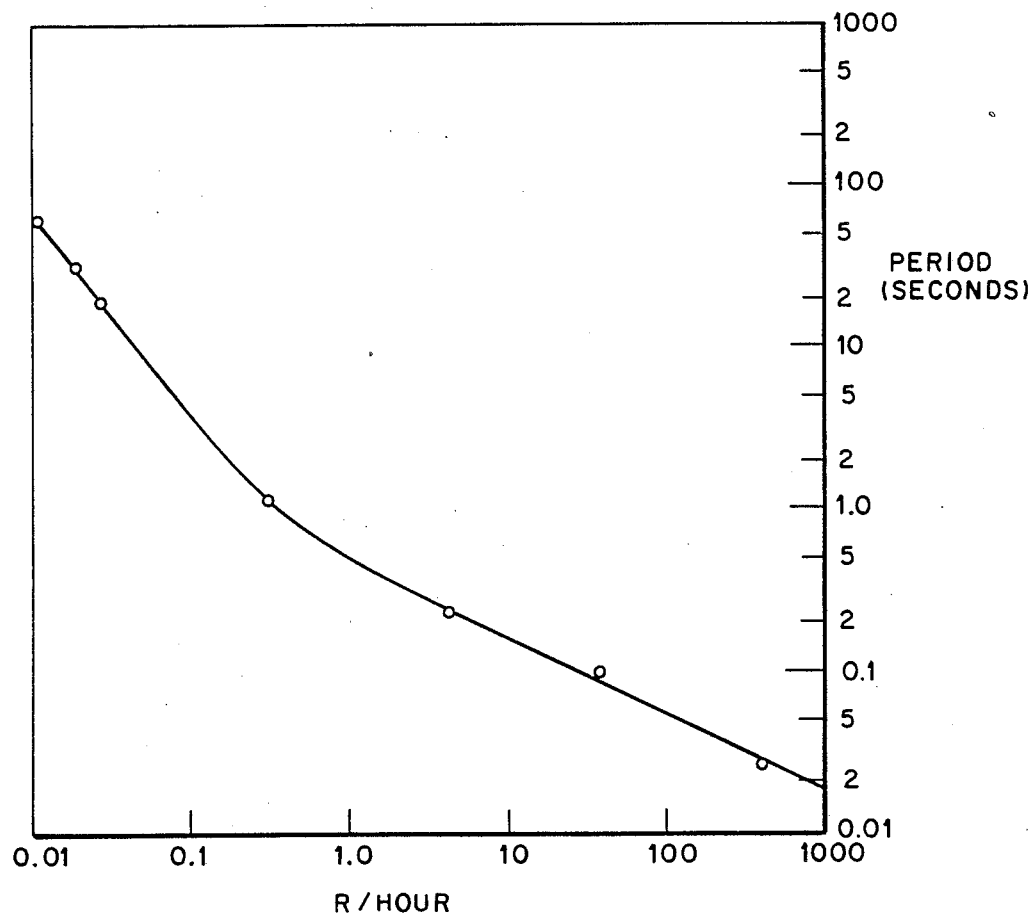
FIG. 2 is a log-log plot of a typical response curve of period (seconds/count) vs radiation field strength (R/hr) for the instrument shown in FIG. 1.

Further, each time gate 5 switches to the low state a low voltage pulse is applied to the second input of gate 7 causing it to switch states from a low to a high output state momentarily activating the speaker 15 and LED 17. The duration of the pulses to the speaker and LED is controlled by the R1 C2 time constant which determines the time that the second input to gate 7 is held below the upper switching threshold before returning to the initial state. When the detector is exposed to an ionizing radiation field, this cycle is repeated continuously at a rate corresponding to the field strength. The value of capacitor C1 is chosen such that an appropriate cycle time is established for a desired radiation level. A typical response curve for the circuit is shown in FIG. 2 wherein a typical data curve of period between blinks in seconds versus radiation field strength in R(roentgen)/hr is shown. The response follows a monotonically decreasing line that can usually be closely approximated by two straight line segments on a log-log plot, as shown.

As shown in FIG. 1, this circuit limits the voltage applied to the chamber 13 anode to +9V, which is well below operation in the saturated region for this particular radiation sensing element. It should be noted here that, although the detector is illustrated using the preferred energy independent air ion chamber as the sensing element, depending on the application, various other radiation sensing elements may be used, such as a sealed dry air ionization chamber, PIN photodiode, or a photoconductor coupled to a small scintillator crystal.

A typical configuration for this instrument is mounting the circuit together with the battery within a fountain pen sized plastic cylinder with a clip for shirt pocket carrying. The LED may be mounted in the top end of the cylinder as a visible radiation indicator. To maintain miniturization, a solid state sensor may be substituted for the ionization chamber.

Figure 3:
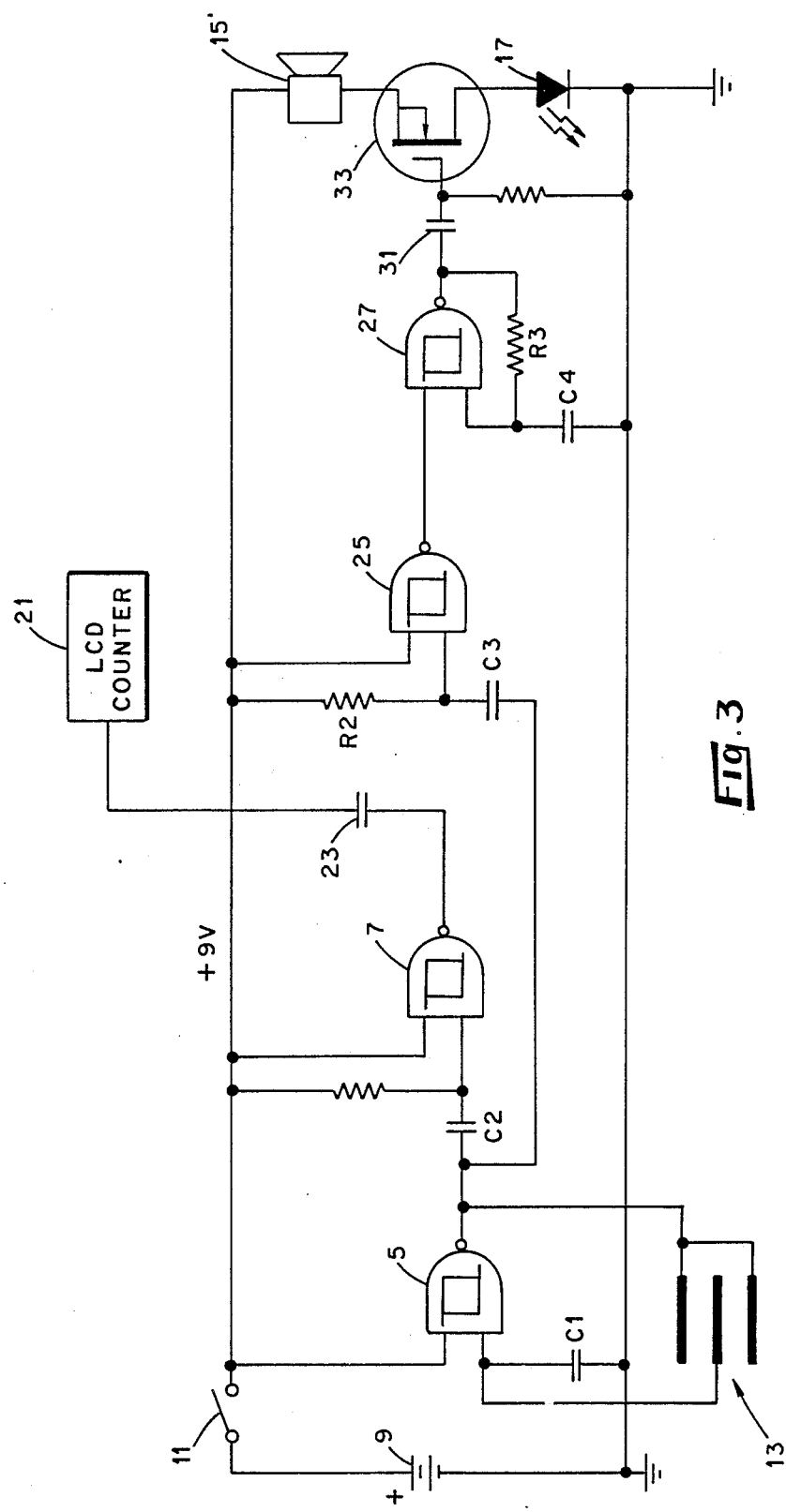
FIG. 3 is a schematic circuit diagram of an alternate embodiment of the detector shown in FIG. 1 wherein like reference numerals indicate like parts to that shown in FIG. 1.

Referring now to FIG. 3, wherein there is shown an alternate embodiment of the invention, it will be seen that the basic detector circuit may be modified to include a digital display counter 21 coupled to the output of gate 7 through a capacitor 23. The display counter records the total counts between selected reset periods.

The output speaker 15' and LED 17 are connected to an output switching stage which uses the additional Schmitt trigger NAND gates 25 and 27 of the quad NAND gate IC. One input of NAND gate 25 is connected directly to the +9V, while the second input is connected to +9V through a resistor R2 and to the output of gate 5 through a capacitor C3. The output of gate 25 is connected to one input of gate 27 whose second input is connected to the output thereof through a feedback resistor R3 and to ground potential through a capacitor C4 to form a gated oscillator circuit which is triggered on when the first input of gate 27 goes high and oscillates at a frequency corresponding to the selected R3-C4 time constant. The output of gate 27 is connected through a coupling capacitor 31 to the gate electrode of a CMOS field effect transistor 33 which is connected in series through its source and drain electrodes with the speaker 15' and LED 17 to act as a switch and a speaker signal amplifier for these elements in response to the detection of ionizing radiation. In this embodiment the speaker is of a more conventional type which responds to an applied oscillating signal, therefore referenced by a like primed reference numeral 15'.

In operation, the gate 25 is held in the low output state through the connection of both inputs to the +9V supply until gate 5 is switched to the low state corresponding to a count of radiation being detected, causing the second input of gate 25 to go low momentarily. This action causes the output of gate 25 to go high, activating the oscillator formed by the gate 27 circuit configuration for the duration of the output pulse from gate 25. This signal is applied to the gate electrode of transistor 33 through capacitor 31 and activates the speaker 15' and turns the LED 17 on for the duration of the count pulse as in the above embodiment.

Figure 4:
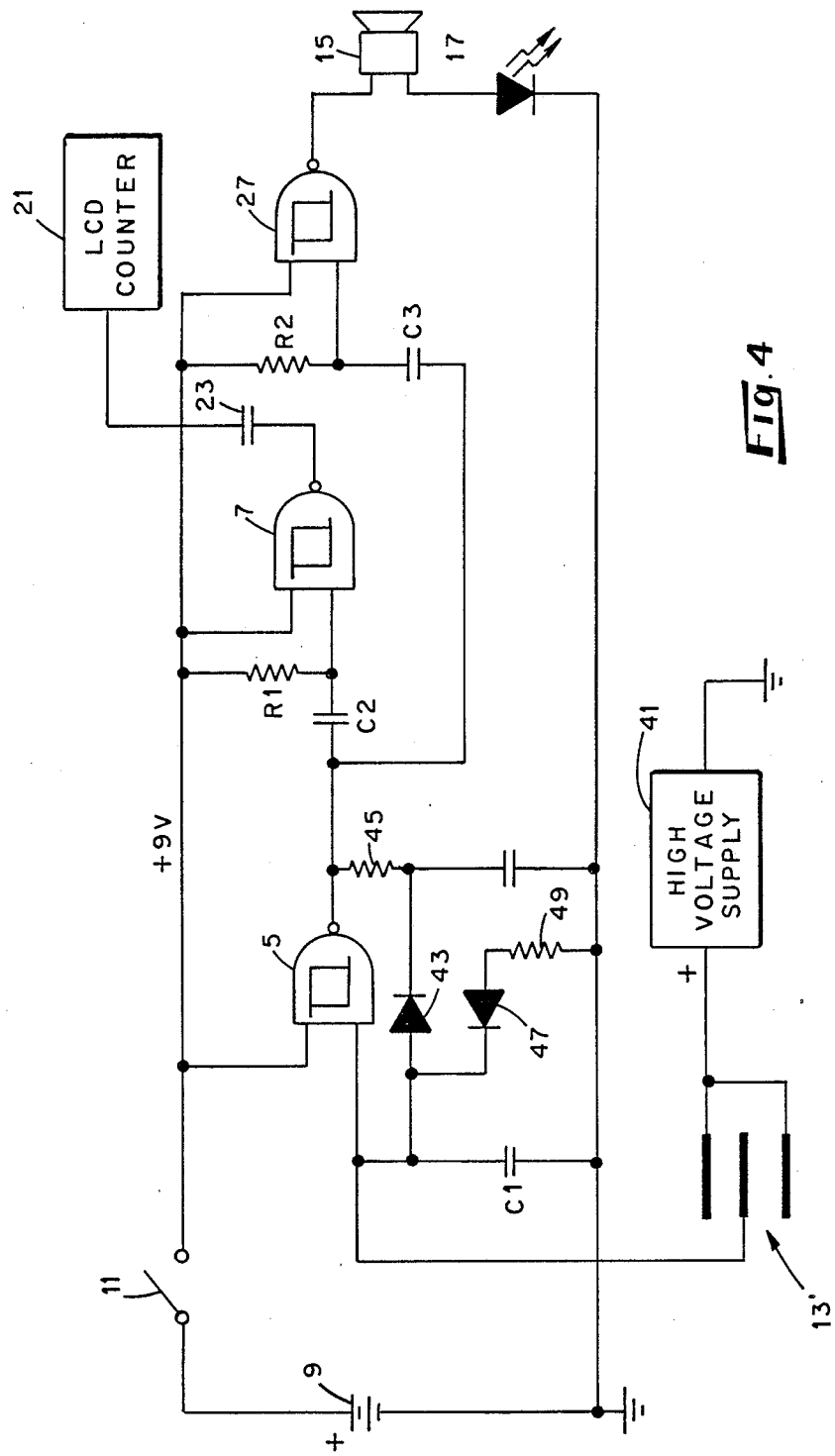
FIG. 4 is a schematic circuit diagram of a further embodiment of a radiation detector according to the present invention which employs a high voltage ion chamber sensor and wherein like reference numerals indicate like parts to that shown in FIG. 3.

Referring now to FIG. 4, a further embodiment of the invention is illustrated which employs a high voltage ion chamber using an external power supply for the chamber and a three NAND gate circuit configuration. The anode of the high voltage ion chamber 13' is connected to the positive output of a high voltage power supply 41 while the cathode electrode is connected directly to the second input of gate 5 and the ungrounded side of C1, as in the above embodiments. In order to provide a discharge path for C1 following each count, the ungrounded side of C1 is connected through a diode 43 and a current limiting resistor 45 to the output of gate 5. The diode is connected with the cathode electrode toward the output of gate 5 so that in the initial state, during which the output of gate 5 is high, the diode is reversed biased and is forward biased when the output of gate 5 goes low. An additional diode 47 and resistor 49 may be series connected between the anode of diode 43 and ground potential in a reverse connection to partially compensate for back-biased current leakage in diode 43.

In this embodiment, the speaker 15 and LED 17 are connected directly to the output of gate 27 and function as in the embodiment of FIG. 1 in that they are activated when the output of gate 27 goes high, indicating the detection of a count of ionizing radiation. The LCD counter 21 is coupled to the output of gate 7 and functions in the same manner as described above to record the radiation counts.

An operating cycle begins with capacitor C1 discharged, so that the second input of gate 5 is low and the output is high. During the detection of ionizing radiation, C1 is charged by the ion chamber current until the voltage at the second input to gate 5 reaches the upper Schmitt trigger threshold. The output of gate 5 goes low and diode 43 is forward biased to rapidly discharge C1 by allowing the discharge current to flow through resistor 45 back into the output of gate 5. When C1 discharges back down to the lower threshold of gate 5, the output of gate 5 goes high which reverse biases diode 43, allowing the cycle to begin again. As in the above embodiments, each time the output of gate 5 switches from high to low, a low voltage pulse is passed to the second inputs of gates 7 and 27 which switch momentarily from a low to a high state to activate the counter 21 and the speaker 15 and LED 17, respectively. In the embodiment shown in FIG. 4, the high voltage ion chamber is operated at a voltage of 30 or more volts.

Thus, it will be seen that a very simple and inexpensive device for the detection and indication of ionizing radiation has been provided which is extremely simple to use. As illustrated in FIG. 2, this detector is responsive over a dynamic range of at least 0.01 to 1000 R./hr. These instruments work on the principal of analog electronic integration of radiation sensor currents in the sub-pico to nano ampere range between fixed voltage thresholds, with automatic voltage reversal or reset each time the appropriate threshold is reached. Since CMOS analog or digital integrated circuits are used, the currents drawn are so small that months of operation are available from a single 9V battery.

Although preferred embodiments of the invention have been described using specific terms, such description is for illustrative purposes only, and it is to be understood that changes and variations may be made therein without departing from the spirit and scope of the invention as set forth in the following claims.

I claim:
1. An ionizing radiation detector, comprising:
first and second switching means each having first and second inputs and an output and each capable of operating in one of a first state and a second state as indicated by corresponding first and second signal levels at the output thereof in response to signal levels applied to said second input exceeding upper and lower threshold switching levels, respectively, determined by the signal level of a reference signal applied to said first input thereof, said second input of said second switching means being coupled to the output of said first switching means so that said second switching means switches states from said first state to said second state momentarily each time said first switching means switches from said second state to said first state;
means for applying said reference signal level to said first inputs of said first and second switching means;
an ionizing radiation responsive means connected between the output and said second input of said first switching means and including a charge storage means which is charged at a rate corresponding to the level of radiation being detected for alternately switching said first switching means between said first and second states at a rate depending upon the level of ionizing radiation detected; and,
an indicating means coupled to the output of said second switching means for indicating the level of radiation being detected in response to the switching rate of said second switching means.

2. The ionizing radiation detector as set forth in claim 1, wherein said first and second switching means are Schmitt trigger NAND gates having first and second inputs, said first inputs of each of said NAND gates connected to a constant voltage power source.

3. The ionizing radiation detector as set forth in claim 2 wherein said ionizing radiation responsive means includes an ionization chamber radiation sensor connected between the output and said second input of said first switching means and in series with a capacitor connected between said second input of said first switching means and ground potential.

4. The ionizing radiation detector as set forth in claim 3 wherein said indicating means includes a light emitting diode connected to the output of said second switching means.

5. The ionizing radiation detector as set forth in claim 4 wherein said indicating means further includes an audible alarm means connected to the output of said second switching means.

6. The ionizing radiation detector as set forth in claim 3 wherein said indicating means includes a counter connected to the output of said second switching means for recording radiation count rates in response to the switching rate of said second switching means.

7. The ionizing radiation detector as set forth in claim 2 wherein said ionizing radiation responsive means includes a high voltage ionization chamber having a separate high voltage power supply connected thereto and having an output connected to said second input of said first switching means and to ground potential through a charge storage capacitor and a discharge switching means connected between the output of said first switching means and said charge storage capacitor for discharging said charge storage capacitor each time said first switching means switches states when the voltage of said charge storage capacitor exceeds said upper switching threshold of said first switching means in response to ionizing radiation sensed by said ionization chamber.

* * * * *